United States Patent

[11] 3,581,851

[72] Inventor Thomas W. Hall, II
 Pontiac, Mich.
[21] Appl. No. 823,885
[22] Filed May 12, 1969
[45] Patented June 1, 1971
[73] Assignee General Motors Corporation
 Detroit, Mich.

[54] TORQUE TRANSMITTING FLUID UNIT WITH POSITIVE LOCK-UP CLUTCH
 8 Claims, 4 Drawing Figs.

[52] U.S. Cl. .................................................. 192/3.31,
 192/.032, 192/84, 74/781
[51] Int. Cl. ................................................... F16d 47/06
[50] Field of Search ........................................... 192/.032,
 .033, .034, 3.28, 3.29, 3.3, 3.31

[56] References Cited
 UNITED STATES PATENTS
2,646,864 7/1953 Miller et al. .................. 192/3.31X
2,675,102 4/1954 Robinson ..................... 192/3.3X
2,707,539 5/1955 Marble ......................... 192/3.31X
2,723,735 11/1955 Banker ......................... 192/3.3
2,828,651 4/1958 Duffield ....................... 192/3.3X
3,059,740 10/1962 Roche .......................... 192/3.28

Primary Examiner—Benjamin W. Wyche
Attorneys—E. W. Christen, A. M. Heiter and Charles R. White ABSTRACT: There is a hydrodynamic unit having a splined sleeve mounted on the turbine of the unit which is movable by a magnetic motor mechanism into a positive locking position with a core having teeth which mesh with the teeth of the sleeve to lock up the unit. When the core is deenergized a spring mechanism moves the sleeve to its unlocking position thereby allowing the unit to function in a conventional manner. Controls are provided to have the unit lock up under predetermined conditions such as in steady state driving at low engine speeds.

INVENTOR.
Thomas W. Hall, II

TORQUE TRANSMITTING FLUID UNIT WITH POSITIVE LOCK-UP CLUTCH

This invention relates to locking devices and more particularly to a synchronized locking clutch and clutch controls for a torque-transmitting unit such as a fluid torque converter.

To improve efficiency of transmissions having hydrodynamic units such as torque converters, lockup or direct-drive clutches are employed to mechanically connect the pump and turbine as the converter reaches the coupling stage. When used in a vehicle such as a passenger car, the engagement of the lockup clutch eliminates converter slip during steady-state driving such as highway cruising and engine torque will be mechanically transmitted through the engaged clutch to the transmission range gearing with optimum efficiency. Locking clutches for converters are also used to mechanically transmit power from the drive wheels to the engine so that engine-braking power can be fully utilized and so that the engine can easily be started by towing or pushing the vehicle.

The locking mechanism of this invention can be employed in all those situations set forth above and utilizes a minimum number of basic parts which operate in a straightforward manner to provide synchronized positive locking of power-transmitting parts. The locking mechanism is operated by a magnetic coil and simplified electrical connections which are part of an automatic control that effects converter lockup during steady-state driving and converter release when torque demand increases.

In the preferred embodiment of this invention the locking elements are compactly located within the housing of the hydrodynamic unit and between the engine crankshaft and the forward rotor of the unit. When energized, a coil disposed between the locking element and the crankshaft energizes a gear-toothed core which attracts and moves a metallic-locking sleeve to a positive locking position. A helical spring between the coil and the sleeve is used to return this sleeve to the disengaged position under predetermined conditions. This arrangement, while providing improved cover and protection of the locking parts will also provide adequate accessibility for inspection and repair purposes. In this invention, the clutch is engaged to provide improved efficiency for cruising and to provide an all mechanical connection between the drive wheels and the engine for improved engine braking and for push starting.

With this invention there is a positive lockup of the hydrodynamic unit by action of synchronized positive clutching members actuated by a magnetic motor mechanism. In the event of deenergization of the motor mechanism a spring device automatically effects disengagement of the clutching mechanism under predetermined torque-transmitting conditions to allow the hydrodynamic unit to operate in its normal manner.

Other features, objects and benefits of this invention will become more apparent from the following detailed description and drawing in which.

Figures 1, 2, 3, 4:
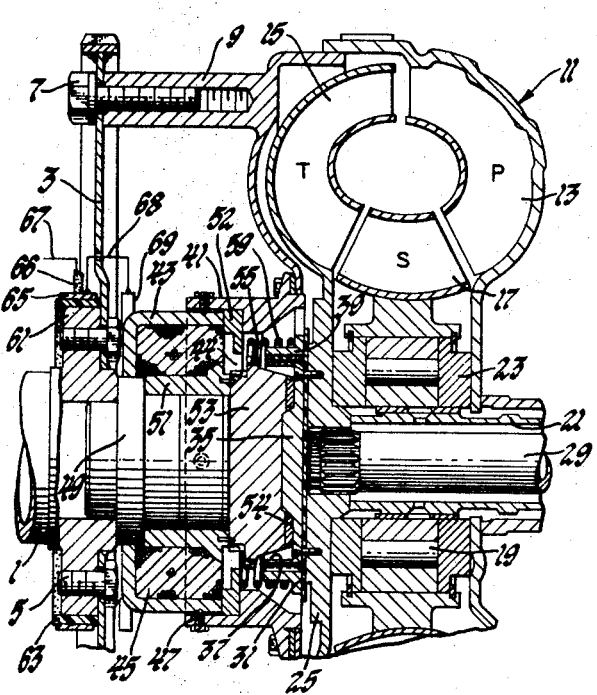
FIG. 1 is a sectional view of a torque converter and the locking device in accordance with this invention.
FIG. 2 is a diagram illustrating controls for the locking device of this invention.
FIG. 3 is an enlarged view of a portion of FIG. 1 showing disengagement of the locking device.
FIG. 4 is a view similar to FIG. 3 showing engagement of the locking device.

As shown in FIG. 1 there is a crankshaft 1 drivingly secured to a flex plate 3 by bolts 5. The flex plate is secured by bolts 7 to a housing 9 of a hydrodynamic torque converter 11 forming part of a power transmission for a vehicle. This housing is drivingly connected to a bladed pump 13, which pumps the hydraulic fluid in the torque converter. The converter also has a bladed turbine 15 and stator 17. The stator is mounted on a one-way brake 19 having an inner race seated on a ground sleeve 21. Annular spacers and thrust bearings 23 are disposed on the opposite sides of the one-way brake.

Turbine 15 is drivingly connected to an annular flange 25, which is splined to a torque-transmitting drive shaft 29 drivingly connected to suitable gearing such as that disclosed in U.S. Pat. No. 3,355,966 to B. F. Boehm. The flange 25 has a disclike separator 31 of nonmagnetic material such as nylon, for example, disposed between the flange and an annular hub portion 35 made of a nonmagnetic metal such as brass. The hub portion is secured to the flange by bolts and has a longitudinally and externally splined cylindrical shoulder 37 for slidably mounting an internally splined, cylindrical locking or connecting sleeve 39 of ferrous metal. The housing 9 is drivingly connected to a cylindrical flange 41, which extends axially outward toward the crankshaft 1. This flange provides a support for the cylindrical housing 43 of a magnetic coil 45. Fasteners 47 securely connect the flange 41 and the coil housing 43. The housing 43 is mounted on a crankshaft plug 49 piloted in the end of the crankshaft. An inner annular sleeve 51 of ferrous metal, which is seated on plug 49 supports coil 45. The flange 41 of the torque converter 11 is also connected to an annular torque-transmitting or driving disc 52 of nonmagnetic material such as brass disposed adjacent one end of the housing 43. This disc has inwardly projecting locking teeth or lugs 44, which mesh with teeth on a locking gear 53 of ferrous metal to thereby drivingly secure the locking gear and the disc. The locking gear 53 connected to sleeve 51 forms the core for coil 45. The locking gear has external splines 55 which are aligned with the splines on the cylindrical shoulder 37 and has an end portion, which is piloted onto the projecting end of hub portion 35. A thrust washer 54 is disposed on the hub portion and contacts the locking gear as shown. The torque-transmitting disc 52 also forms a seat for a helical spring 59, which bears against the radially extending flange of the sleeve 39 as best shown in FIGS. 1 and 2. Normally the spring biases the sleeve 39 to the unlocked FIGS. 1 and 3 positions to allow the converter to operate in a conventional manner, providing a large torque multiplication ratio at stall and progressively smaller torque multiplication ratios up to the coupling point. For mechanical drives, the coil 45 is energized and its core formed gear 53 will pull the metallic sleeve into the FIG. 4 position with its splines meshing with the splines 55 of hub 53 to drivingly connect the housing 9 to the hub portion 35 and thereby lock up the torque converter so that the pump and turbine rotate as a unit and torque will be mechanically transmitted to drive shaft 29. This provides important benefits at low engine speeds such as when cruising since converter slip is eliminated and transmission efficiency is improved.

The crankshaft has an annular flange 61 on which an annular nylon insulator 63 is mounted. An annular slip ring 65 is mounted on the insulator and a carbon brush 66 connected to conductor 67 contacts the slip ring. A suitable conductor 68 contacts the slip ring with a connector 69 electrically connected to the winding of magnetic coil 45.

The electrical controls for the magnetic coil are diagrammatically illustrated in FIG. 2. As shown in this Figure there is a battery 81, which is connected by suitable conductors to a transmission overdrive relay 83 and a magnetic coupling relay 85. These relays are conventional and have the same construction; battery current applied to terminal 84 goes to both coil C and main contact points P. When the coil is grounded through any switch in series with terminal 88, the points are closed against the tension of spring S and the main current is delivered to the coil or solenoid as the case may be. An engine ignition switch 87 is utilized in the connection between the battery and the two relays to control the circuit. However, even if the ignition switch is closed, neither circuit is completed until the number two terminal 88 of each relay is grounded. The number two terminal on the overdrive relays is grounded in response to closing of a switch by a speed-responsive governor 90 at a predetermined speed such as 35 m.p.h., for example. When the number two terminal of the overdrive relay is grounded, current will flow to overdrive solenoid 91, which is then energized. This solenoid operates a valve or other suitable operator, not shown, for shifting the transmission into a cruising gear such as overdrive. At the same time, the number two terminal of the magnetic-coupling relay should be grounded so that the converter can shift to its lockup condition. For this purpose there are provided two intermediate switches; vacuum electric switch 93 and manual dash switch 95. The vacuum electric switch is actuated by manifold vacuum in response to accelerator position. At higher vacuums, above 10 inches mercury for example, the switch 93 closes and the ground circuit is completed energizing the magnetic coupling. In the event the throttle is opened, the vacuum will drop below the contact point as when performance is called for to deenergize the coil so that the coupling will unlock with spring 59 urging sleeve 39 to the FIG. 3 position. In the event that the circuit to the coil is opened, the converter will revert back to its normal operation. The dash switch 95 is a manual override switch for opening and closing the grounding circuit to the magnetic coupling as desired by the driver when the vacuum electric switch 93 is closed. There is also a switch 96 in parallel with the governor switch to provide an optional bypass to ground so that the coupling could be energized as desired irrespective of road speed. The indicator bulb 97 in the circuit between the coil and the magnetic coupling relay goes on when the coil 45 is energized.

The turbine 15 and gear-toothed hub or core are rotating at substantially the same speed when the control system calls for direct mechanical drive. With this synchronization of parts the clutch sleeve easily moves to its engaged position. When the driver chooses, the coil may be energized irrespective of road speed by closing switch 96, which bypasses the governor to ground. This provides important benefits in that improved push starting and engine braking are obtained. For push starting switch 93 is mechanically closed by any suitable operator mechanism along with the closing of switches 95 and 96. This completes the ground circuit when the engine is dead and there is no engine vacuum.

The drawing and detailed description are merely illustrative of the invention, which is defined in the following claims:

I claim:

1. In combination with a torque-transmitting unit having input rotor means driven by an input and having output rotor means driven by said input rotor means, positive locking means for selectively and drivingly coupling said input rotor means to said output rotor means to permit said input to directly drive said output rotor means, said positive locking means comprising axially movable splined sleeve means rotatably driven by one of said rotor means and located radially inwardly thereof, said sleeve means being cylindrical and having an outwardly extending flange, connector means drivingly secured to the other of said rotor means and having teeth drivingly engageable by said splined sleeve connector means in response to predetermined axial movement of said splined sleeve means from a predetermined position spaced from said connector means to thereby positively connect said rotor means together, electromagnetic motor means for exerting a predetermined force on said splined sleeve means when energized to axially move said splined sleeve means from said predetermined position into driving engagement with said connector means, and spring means disposed around said splined sleeve means and contacting said flange for automatically moving said splined sleeve means to said predetermined position in response to removal of said predetermined force from said splined sleeve means to thereby permit said input rotor means to drive said output rotor means.

2. In a transmission, a hydrodynamic torque-transmitting unit having input rotor means and output rotor means, power-transmitting means operatively connected to said output rotor means, rotatable input means drivingly connected to said input rotor means, axially movable first positive clutching means carried by one of said rotor means and disposed radially inwardly thereof, second positive clutching means axially aligned with said first clutching means operatively connected to the other of said rotor means engageable by said axially movable first clutching means, electrically energizable motor means for shifting said axially movable clutching means from a predetermined position spaced from said second clutching means to a positive engagement position with said second clutching means, and additional motor means for moving said axially movable clutch means to said predetermined position in response to deenergization of said first-mentioned motor means to thereby permit torque to be transmitted from said input rotor to said output rotor means through the medium of hydraulic fluid in said unit, and torque demand signal means and transmission output speed signal means providing control means for energizing and deenergizing said motor means in accordance with predetermined torque demand and output speed signals.

3. The transmission defined in claim 2 wherein said axially movable clutching means comprises a cylindrical positive clutching sleeve splined to said output rotor means, said fixed clutching means comprises a driving member operatively connected to said input rotor means, said fixed clutching means having teeth which mesh with the teeth on said splined sleeve in response to movement of said sleeve to said locking position, and said first-mentioned motor means comprising electromagnetic means for moving said sleeve into said locking position.

4. The transmission defined in claim 2 wherein said axially movable clutching means comprises a clutching sleeve coaxial with said power transmission means and splined to said output rotor means, said fixed clutching means comprises a toothed driving member operatively connected to said input rotor by a connecting member of nonmagnetic material which can be meshed with the teeth on said splined sleeve in response to movement of said sleeve to said locking position, said first-mentioned motor means comprising magnetic means for moving said sleeve into said engaged position, and said second motor means comprising spring means operatively connected to said sleeve and to said driving member for moving said sleeve back to said predetermined position in response to deenergization of said motor means.

5. The transmission defined in claim 2, said first-mentioned motor means being a magnetic coil having a core, a source of electrical energy, first circuit means for connecting said coil to said source, said first circuit means including torque demand responsive switch means and transmission output speed responsive switch means for making said circuit means under predetermined torque demand and transmission output speed conditions to energize said coil and effect the engagement of first and second clutching means and for breaking said circuit means under other predetermined torque demand and transmission output speed conditions to effect the disengagement of said first and second clutching means, and manual switch means disposed in parallel with said speed responsive switch means for completing said first circuit means at any transmission output speed.

6. A hydrodynamic unit having input rotor means and output rotor means, torque-transmitting means operatively connected to said output rotor means, rotatable input means drivingly connected to said input rotor means, an axially movable cylindrical clutching sleeve of ferrous metal disposed radially inwardly of one of said rotor means and supported for axial movement thereon, positive clutching means operatively connected to the other of said rotor means for engaging said axially movable sleeve to connect said input means to said output rotor, electromagnetic motor means disposed between said input means and said positive clutching means and energizable to shift said axially movable clutching sleeve from a predetermined position spaced from said fixed clutching means to a positive engaging position with said fixed clutching means when said input and output rotor means obtain substantially the same speed, and coil spring means disposed around and contacting axially movable clutching sleeve for moving said axially movable clutch sleeve to a disengaged position in response to deenergization of said first-mentioned motor means to thereby permit torque to be transmitted from said input rotor to said output rotor means through the medium of hydraulic fluid in said unit.

7. In combination, power input means, a hydrodynamic unit having input rotor means and output rotor means, connecting means drivingly connecting said input means with said input rotor means, a positive locking device for selectively and drivingly connecting said input rotor means and said output rotor means to thereby permit said input means to directly drive said output rotor means, said positive locking device comprising an axially movable cylindrical sleeve driven with one of said rotor means and disposed radially inwardly thereof, connector means driven by the other of said rotor means and drivingly engageable with said sleeve in response to predetermined axial movement of said sleeve from a predetermined position spaced from said second connector means, electromagnetic motor means adjacent to said power input means for moving said sleeve from said predetermined position into driving engagement with said connector means when said sleeve and connector means are synchronized, and second motor means for automatically moving said sleeve to said predetermined position in response to release of said sleeve by said first motor means to thereby permit said input rotor means to drive said output rotor means, and control means responsive to a signal proportional to the speed of said output rotor means and responsive to a torque demand signal for energizing said first motor means to effect the positive locking engagement of said sleeve and connector means.

8. In a transmission for a vehicle, an input shaft, a hydrodynamic torque converter having input rotor means, housing means for said torque converter drivingly connecting said input rotor means and said input shaft, said torque converter also having output rotor means adapted to be driven by fluid in said converter circulated by said input shaft, a torque-transmitting shaft splined to said output rotor means, selectively engageable positive clutching means for positively connecting said power input means to said output rotor means, a support member axially extending from said input shaft, electrically energizable magnetic coil means having a core for effecting the engagement of said clutch means, said magnetic coil and core being mounted on said support member and being located adjacent to said input shaft, said output rotor means having an externally splined shoulder of nonmagnetic material rigidly secured thereto, said clutching means comprising a fixed clutch part disposed adjacent to said magnetic coil means and secured to said core and energizable by said coil, drive means of nonmagnetic material drivingly connecting said housing and said fixed clutch part, said clutching means further comprising movable clutch means formed by a splined cylindrical sleeve of ferrous metal located radially inwardly of said output rotor means and mounted for axial movement on said splined shoulder of said output rotor means and movable by a predetermined magnetic force exerted by said magnetic coil means into positive selective engagement with said fixed clutch part, and coil spring means being disposed around said sleeve in contact with said flange and further disposed between said drive means and said sleeve for disengaging said clutch in response to a reduction in said predetermined magnetic force on said sleeve exerted by said magnetic coil, and control means comprising electric circuit means for energizing said magnetic coil means in response to predetermined torque demand signals and transmission output speed signals to effect the engagement of said clutching means for efficient vehicle cruising.